United States Patent
Zhi et al.

(10) Patent No.: US 9,967,029 B2
(45) Date of Patent: May 8, 2018

(54) VISIBLE-LIGHT COMMUNICATION MIMO SYSTEM AND METHOD FOR REALIZING DATA TRANSCEIVING THEREFOR

(71) Applicant: ZTE CORPORATION, Shenzhen, Guangdong Province (CN)

(72) Inventors: Zhou Zhi, Shenzhen (CN); Wenxin Hong, Shenzhen (CN); Wei Wei, Shenzhen (CN); Zhong Yu, Shenzhen (CN); Xiaohong Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 163 days.

(21) Appl. No.: 14/392,183

(22) PCT Filed: Aug. 30, 2013

(86) PCT No.: PCT/CN2013/082648
§ 371 (c)(1),
(2) Date: Dec. 23, 2015

(87) PCT Pub. No.: WO2014/205911
PCT Pub. Date: Dec. 31, 2014

(65) Prior Publication Data
US 2016/0218803 A1    Jul. 28, 2016

(30) Foreign Application Priority Data
Jun. 26, 2013 (CN) .......................... 2013 1 0260167

(51) Int. Cl.
*H04B 10/00*    (2013.01)
*H04B 10/116*  (2013.01)
*H04B 7/0413*  (2017.01)

(52) U.S. Cl.
CPC ......... *H04B 10/116* (2013.01); *H04B 7/0413* (2013.01)

(58) Field of Classification Search
CPC ... H04B 10/116; H04B 10/112; H04B 10/114; H04B 10/1143; H04B 10/1149; H04B 10/1141
(Continued)

(56) References Cited

U.S. PATENT DOCUMENTS 9,111,186 B2 *    8/2015  Blasinski ........... G06K 19/0614
2010/0084470 A1*  4/2010  Scott .................... G06K 7/1093
                                                                    235/462.09
(Continued)

FOREIGN PATENT DOCUMENTS

CN    102171707 A    8/2011
KR    100739284 B1   7/2007

OTHER PUBLICATIONS

International Search Report and Written Opinion dated Apr. 3, 2014 in PCT/CN2013/082648.
(Continued)

*Primary Examiner* — Hanh Phan
(74) *Attorney, Agent, or Firm* — Plumsea Law Group, LLC (57) ABSTRACT

A visible light communication MIMO system and a method for realizing data transceiving therefor are disclosed. The method includes: converting data of a sending end into two-dimensional code information containing locating information through light intensity modulation and compilation to send; a receiving end scanning received two-dimensional code information, and rectifying the received two-dimensional code information according to the locating information; and demodulating the rectified two-dimensional code information to obtain data. In the embodiments of the present document, the rectification on the image with the geometric distortion is implemented by using the two-dimensional code technology, and the rectification on the plane image sent by an LED array in the visible light
(Continued)

communication MIMO system is implemented, which guarantees that pixels of various points within one frame of image are simultaneously and correctly detected, and achieves the object of sending and receiving frames synchronously, thereby improving the data transmission efficiency.

15 Claims, 3 Drawing Sheets

(58) Field of Classification Search
USPC ....... 398/172, 118, 119, 127, 128, 130, 131, 398/135, 115, 136; 315/291, 294, 312, 315/152, 307, 293
See application file for complete search history.

(56) References Cited

U.S. PATENT DOCUMENTS

2012/0155889 A1    6/2012    Kim
2012/0275796 A1    11/2012    Yokoi

OTHER PUBLICATIONS

Tian Hao et al: "Cobra", Proceedings of the 10th International Conference on Mobile Systems, department of Computer Science and Engineering, Michigan State University, USA, Jan. 1, 2012, XP055274420.
Tobias Langlotz et al: "Unsynchronized 4D Barcodes (Coding and Decoding Time—Miltiplexed 2D Colorcodes)", Nov. 28, 2007, Berlin Heidelberg, XP055274418.
Wenjia Yuan et al: "Computer Vision Methods for Visual MIMO optical system", Computer Vision and Patter Recognition Workshops (CVPRW), Jun. 20, 2011, pp. 37-43, XP031926505.
European Search Report dated Jun. 8, 2016 in European Patent Application No. 13888256.8.
Office Action dated Sep. 19, 2017 for Chinese Patent Application No. 201310260167.7.
Liangliang Li, "Research on Visible Light Parallel Communication System's Scheme and Key Technology", published Mar. 2, 2012, retrieved from Wanfang Data, excerpt from thesis for Master's Degree of the Nanjing University of Posts and Telecommunications (Chaper 4.1 & Chapter 5.1, Drawings 4-12 & Drawings 4-16).
Communication pursuant to Article 94(3) EPC dated Dec. 18, 2017 for European Patent Application No. 3888256.8.

\* cited by examiner

VISIBLE-LIGHT COMMUNICATION MIMO SYSTEM AND METHOD FOR REALIZING DATA TRANSCEIVING THEREFOR

CROSS-REFERENCE TO RELATED APPLICATION(S)

This application is the U.S. National Phase application of PCT application number PCT/CN2013/082648 having a PCT filing date of Aug. 30, 2013, which claims priority of Chinese patent application 201310260167.7 filed on Jun. 26, 2013, the disclosures of which are hereby incorporated by reference.

TECHNICAL FIELD

The present document relates to the visible light communication technology, and particularly, to a visible light communication multiple input multiple output (MIMO) system and a method for realizing data transceiving therefor.

BACKGROUND OF RELATED ART

The visible light communication is an emerging short-distance high-speed wireless optical communication technology developed based on the light emitting diode (LED) technology. The most important feature of the visible light communication is that it meets the demand for normal lighting while supporting the communication and it is green and environmental friendly and has no electromagnetic interference. With the development of the visible light communication, a visible light communication MIMO system has also become one of the hotspot technologies.

The requirement on the basic structure of the visible light communication MIMO system is: designing a transmitter into an LED array structure, and requiring that the luminous intensity meets the indoor lighting requirements (500lx); and designing a receiver into a two-dimensional array multi-point detection structure. The visible light communication MIMO system converts the disadvantage of "multipath effect" caused by the multiple reflections of the light ray in the space into an advantage, which exponentially improves the system throughput and the data transmission rate with the spatial multiplexing technology, and also effectively reduces the influence of intersymbol interference with the array sending technology. Thus it can be seen that, the MIMO system is extremely applicable to a diffused channel of the visible light communication, and it reduces the sensibility of a mobile terminal to the jitter of the optical channel, which can enhance the signal received ability and improve the channel utilization rate in the cases of the location change of the terminal, the channel sudden change and the jitter and so on.

The application of the MIMO system mainly has three hotspot technologies in the visible light communication: one is the spatial diversity, that is, at both a sending end and a receiving end, the data are transmitted in a form of array to reduce the bit error caused by the delay and improve the channel reliability; another one is the spatial multiplexing, that is, at the sending end, the data are transmitted by means of layered space-time multiplexing (BLAST), which can exponentially improve the system throughput and the data transmission rate; and still another one is the beamforming, that is, it is to make the channel directivity precise by reducing the field of view of the light source, thereby reducing the channel interference (ICI) between the adjacent light sources.

At present, in the visible light communication MIMO system, when jitter occurs in the mobile terminal, a distortion will occur in the data of the sending end, thereby causing receiving and sending frames asynchronously; and the optical channel received by the receiver will be forced to interrupt, thus the communication cannot be continued. Therefore, when a long string of locating information is continuously transmitted, the information loss will also be caused due to the occurred jitter, which reduces the data transmission efficiency.

SUMMARY OF THE INVENTION

The present document provides a visible light communication MIMO system and a method for realizing data transceiving thereof, which can guarantee receiving and sending frames synchronously, thereby improving the data transmission efficiency.

In order to solve the above technical problem, the present document discloses a method for realizing data transceiving in a visible light communication multiple input multiple output MIMO system, which comprises: converting data of a sending end into two-dimensional code information containing locating information through light intensity modulation and compilation, and then sending the two-dimensional code information containing locating information;

a receiving end scanning received two-dimensional code information, and rectifying the received two-dimensional code information according to the locating information; and demodulating the rectified two-dimensional code information to obtain data.

Preferably, the compilation is: compiling the data by using a two-dimensional code compiler, and converting the data into a two-dimensional code graphic.

Preferably, the locating information is locating graphics constituted in a specific scale conforming to a scale invariance feature and located in the two-dimensional code graphic.

Preferably, there are three locating graphics.

Preferably, said scanning received two-dimensional code information comprises: performing lateral scanning and vertical scanning on a plane image containing the two-dimensional code graphic;

removing redundant light interference in the plane image; and performing image binaryzation processing on the plane image from which the redundant light interference is removed.

Preferably, said removing redundant light interference in the plane image comprises: recording a light brightness $E_i$ of each pixel point in the plane image, comparing the light brightness $E_i$ with a preset light intensity value range ($E_{min}$, $E_{max}$), and removing light intensity values exceeding or less than the range ($E_{min}$, $E_{max}$).

Preferably, said performing image binaryzation processing on the plane image from which the redundant light interference is removed comprises:

respectively finding a maximum light brightness value $E_{max}$ and a minimum light brightness value $E_{min}$ in the plane image, and calculating an average value $E_{average}$ of the maximum light brightness value $E_{max}$ and the minimum light brightness value $E_{min}$; and according to the average value $E_{average}$, dividing brightness values in the image into two categories: light brightness values greater than the average value $E_{average}$ and light brightness values less than the average value $E_{average}$, wherein, the light brightness values greater than the average value $E_{average}$ are black images and represented as 1; and the light brightness values less than the average value $E_{average}$ are white images and represented as 0.

Preferably, said rectifying the received two-dimensional code information according to the locating information comprises:

performing lateral scanning and vertical scanning on the two-dimensional code graphic until three locating graphics in the two-dimensional code graphic are acquired;

respectively determining a center point of each locating graphic, and calculating a length of each side of a triangle constituted by three center points;

calculating a scanning area S' according to lengths of two short sides of the triangle and an inclination angle α, and comparing the scanning area S' with an actual area S to obtain a slope;

rotating the two-dimensional code graphic according to the obtained slope, and restoring an inclined two-dimensional code graphic; and determining a boundary contour of the plane image, and calculating rectified coordinates according to a bilinear interpolation algorithm.

Preferably, the obtained slope is obtained according to the following formula:

$$\text{Ratio} = \frac{S'}{S} = \frac{\frac{1}{2} \times a \times b}{\frac{1}{2} \times (a + b \times \sin\alpha) \times b} \geq \frac{a}{a + a \times \sin\alpha} = \frac{1}{1 + \sin a};$$

wherein,

S' is the scanning area, and S is the actual area;

a represents the length of a short side a in the sides of the triangle, and b represents the length of a short side b in the sides of the triangle; and α is the inclination angle.

The present document further provides a visible light communication MIMO system, which comprises a sending end and a receiving end, wherein, the sending end is configured to: convert data to be sent into two-dimensional code information containing locating information through light intensity modulation and compilation, and then send the two-dimensional code information containing locating information; and the receiving end is configured to: scan received two-dimensional code information, and rectify the received two-dimensional code information according to the locating information; and demodulate the rectified two-dimensional code information to obtain data.

Preferably, the sending end at least comprises a two-dimensional code compilation module and a sending module, wherein, the two-dimensional code compilation module is configured to: compile the data to be sent into a two-dimensional code graphic; and the sending module is configured to: through the light intensity modulation, modulate the compiled two-dimensional code graphic to a point light source and send the compiled two-dimensional code graphic in a form of a plane image.

Preferably, the sending module is an LED array, and a transmitting array uses a multiplexing technology.

Preferably, the two-dimensional code graphic comprises locating graphics; and the locating graphics are constituted in a specific scale conforming to a scale invariance feature.

Preferably, there are three locating graphics which are respectively located at three vertex angles of the two-dimensional code graphic.

Preferably, the receiving end at least comprises a receiving module, a preprocessing module, a rectification module and a demodulation module, wherein, the receiving module is configured to: receive the plane image containing the two-dimensional code information from the sending end;

the preprocessing module is configured to: scan the received plane image containing the two-dimensional code information, remove redundant light interference and perform binaryzation processing, and output a processed two-dimensional code graphic to the rectification module;

the rectification module is configured to: scan the two-dimensional code graphic from the preprocessing module, and acquire the locating graphics; and locate a boundary contour of the two-dimensional code graphic according to the locating graphics and rectify the two-dimensional code graphic to output to the demodulation module; and the demodulation module is configured to: perform two-dimensional code demodulation on the processed two-dimensional code graphic from the rectification module, and obtain original data.

Preferably, the receiving module is a two-dimensional array multipoint photoelectric detector.

Preferably, an imaging lens is set above the two-dimensional array multipoint photoelectric detector and used for mirroring the plane image sent remotely to a receiver array.

Preferably, the receiving module collects the plane image from the sending end by using a preset frame rate synchronous with a transmitting frame rate of the LED array of the sending end.

The technical scheme provided in the present document comprises: converting data of a sending end into two-dimensional code information containing locating information through light intensity modulation and compilation, and then sending the two-dimensional code information; a receiving end scanning the received two-dimensional code information, and rectifying the received two-dimensional code information according to the locating information; and demodulating the rectified two-dimensional code information to obtain data

BRIEF DESCRIPTION OF THE DRAWINGS

Here, the illustrated accompanying drawings are used to provide a further understanding of the present document and constitute a part of the present document. The schematic embodiments and illustrations thereof of the on present document are used to explain the present document, but do not constitute an inappropriate limitation on the present document. In the drawings.

PREFERRED EMBODIMENTS OF THE INVENTION

The two-dimensional code is a graphic code that uses a certain kind of specific geometric figures, black-and-white array graphics distributed in plane (in a two-dimensional direction) according to a certain regularity to record data symbol information; and it uses a plurality of geometric figures corresponding to a binary system to represent texts and numerical information in the code compilation, and it is automatically identified through an image input device or a photoelectric scanning device, which implements automatic information processing. The two-dimensional code can simultaneously express information in the lateral orientation and the vertical orientation, thus the two-dimensional code can express a great deal of information within an extremely small area. Moreover, the two-dimensional code also possesses an ability of resisting the graphic geometric distortion, and when a distorted graphic is scanned in angles of rotation and inclination and so on, it also can correctly restore pixel values of all points within the graphic through the software calculation, and extract the information. In the present document, the two-dimensional code and the array structure characteristic of the visible light communication MIMO system are combined, which implements the visible light communication MIMO system and the data transceiving thereof, to guarantee sending and receiving frames synchronously, thereby improving the data transmission efficiency.

Figure 3:
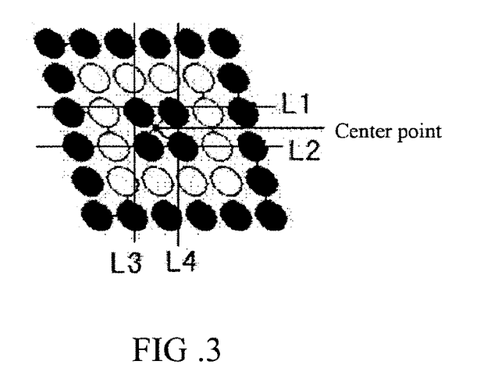
FIG. 3 is a schematic diagram of locating graphics in the sent plane image according to the present document.

In the present document, a transmitter located at the sending end of the visible light communication MIMO system can use an LED array as a signal transmitting system. The transmitting array uses the multiplexing technology, all point light sources are mutually independent and send different signals, and the sent signals are differentiated with the light intensities corresponding to binary values 0 and 1 (e.g., "light intensity is strong" represents 1 and "light intensity is weak" represents 0). "Plane image" signals sent at one time are recorded as one frame, thus a structure of the frame is constituted by a plurality of point pixels with different light-dark intensities, and it corresponds to the array structure of the two-dimensional code. In order to fully utilize the advantage of rectifying the graphics with geometric distortion through the two-dimensional code, a plane principle is determined based on the existing three points in the present document, and three locating graphic areas are set at the three vertex angles of the LED array, for example, the locating graphic presents a "homocentric square" shape, the scale is divided as strong-weak-strong strong-weak-strong according to the light intensity from outside to inside, and the scale values appear as 1:1:2:1:1 in turn. The possibility of such width scale characteristic 1:1:2:1:1 appearing at other locations of the plane image is very small, thus it is regarded as a scanning characteristic of the locating graphic. Based on the characteristic, when one scanning straight line (such as an L1, L2, L3 and L4 as shown in FIG. 3) of the computer is cut as 1:1:2:1:1 alternately according to the light intensity, it can be regarded that the scanning straight line goes across the locating graphic. Moreover, when a distortion occurs in the plane image detected by the receiver, the locating graphic also presents the same distortion, and the size of each point in the locating graphic also has the same change, but only the scale characteristic 1:1:2:1:1 is not changed. Because of the feature that such scale characteristic is not changed with the size, rotation and inclination of the whole plane image, the locating graphic can be found according to such scale characteristic. After finding the locating graphic, a center point of the graphic is a locating point of the plane image, such as the center point as shown in the FIG. 3.

It should be noted that, the shape of the locating graphic is not limited to the above "homocentric square" shape, and it is set according to a size and a data amount of the LED array, for example, an LED array with a large size and a small data amount can use a symmetric polygon (such as a hexagon and so on) as a locating graphic, as long as the scale invariance feature is satisfied.

In the present document, a receiver located at the receiving end of the visible light communication MIMO system is a two-dimensional array multipoint photoelectric detector. A spotlight component (such as a convex lens) is set above the two-dimensional array multipoint photoelectric detector, and it is used for mirroring the remotely sent plane image to a receiver array, and at this point, each pixel (or a group of pixels) of the image will be mapped into the two-dimensional array multipoint photoelectric detector, which improves the channel receiving efficiency. Meanwhile, the receiver can be controlled by an embedded computer, according to the two-dimensional code scanning technology, pixels of various points (including lateral direction and vertical direction) are scanned line by line, and pixels with the strong light intensity are represented by black graphics, and pixels with the weak light intensity are represented by white graphics. Ultimately, the plane image received by the two-dimensional array multipoint photoelectric detector corresponds to a two-dimensional graphic, and the graphic distorted due to the jitter is restored through the calculation, and the independent data signals are extracted.

In the present document, the receiver continuously scans the received images until the locating graphics in the particular shape are detected, so as to identify the start of the frames. And it is to take the advantage of anti-distortion of the two-dimensional code graphic, when the jitter occurs and a graphic with the geometric distortion is received, it also can guarantee that the received plane image which is rectified is identical with the plane image sent by the LEDs by rectifying the plane image, thereby guaranteeing various pixels within one frame can be simultaneously and correctly restored and detected, to achieve the object of sending and receiving frames synchronously. Moreover, in the present document, while the frame synchronization is guaranteed, the influence of intersymbol interference within one frame of data also can be reduced.

In conclusion, the sending end of the visible light communication MIMO system of the present document sends the data in parallel with the multiplexing technology, which improves the sending gain, and also improves the illumination intensity in the meantime. Moreover, the two-dimensional array multipoint photoelectric detector array of the receiving end is in a two-dimensional multipoint structure and corresponds to the sending array, and the parallel data can be better mapped to the two-dimensional array multipoint photoelectric detector array via an imaging lens, which improves the receiving efficiency.

Figure 1:
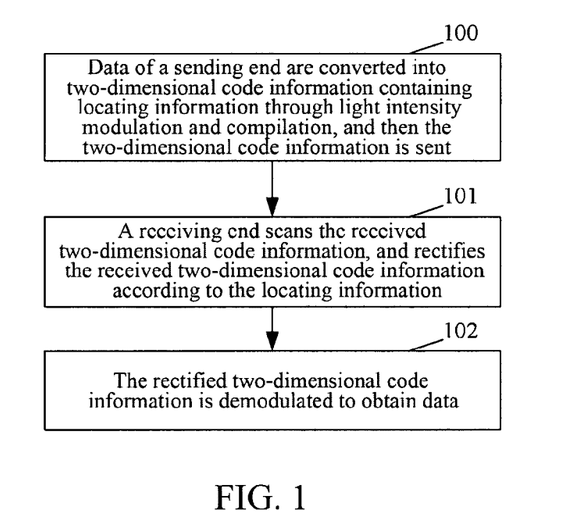
FIG. 1 is a flow chart of a method for realizing data transceiving in a visible light communication MIMO system according to the present document.

FIG. 1 is a flow chart of a method for realizing data transceiving in a visible light communication MIMO system according to the present document, and as shown in FIG. 1, the method of the present document includes the following steps.

In step 100, data of a sending end are converted into two-dimensional code information containing locating information through light intensity modulation and compilation, and then the two-dimensional code information is sent.

Figure 2:
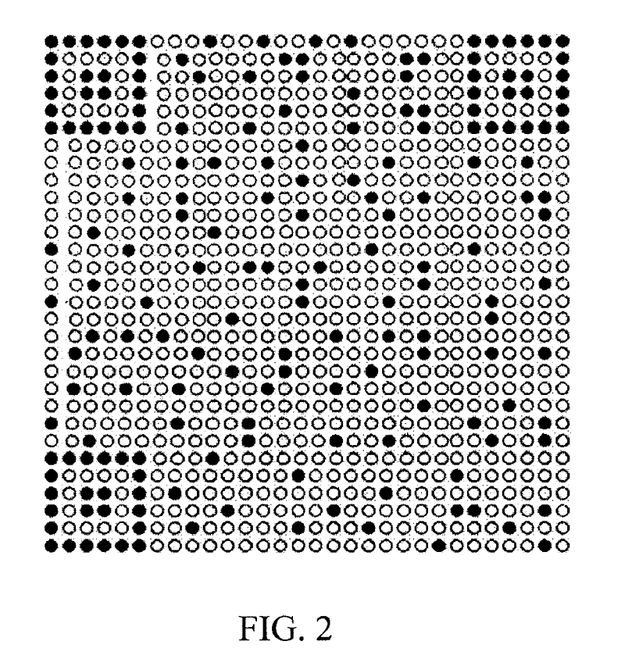
FIG. 2 is a schematic diagram of one "frame" of plane image sent by the LED array of the sending end of the visible light communication MIMO system with the multiplexing technology according to the present document.

As shown in FIG. 2, in the step, one frame of plane image sent by an LED array of the sending end of the visible light communication MIMO system with the multiplexing technology is a plane image transmitted by an N*N LED array (N represents the number of pixel points). By means of the light intensity modulation, information of 1 and 0 is differentiated by "bright" and "dark", in the FIG. 2, black represents "bright" namely the information of 1, and white represents "dark" namely the information of 0, and one frame of plane can send (N*N)bits of information. The data are compiled into a two-dimensional code graphic through a two-dimensional code compiler through the serial-parallel conversion to be modulated to point light sources to send. Wherein, various point light sources carry different information for multiplexing sending. The two-dimensional code compiler can be the existing two-dimensional code compiler.

In the sent (N*N)bits of information, (3*n*n) bits of locating information is set (n represents the length of the side of the locating graphic), the (3*n*n) bits in the (N*N) bits are regarded as the locating overhead, which is a frame start marker. As for the locating graphics at the three vertex angles shown in the FIG. 2, the locating graphics are constituted by graphics in a specific scale conforming to a scale invariance feature. The locating graphics do not carry any effective data information.

The step stresses that, at the sending end of the visible light communication MIMO system of the present document, the data to be sent are complied by means of two-dimensional code. And how to specifically implement the compilation is the prior art known by the people skilled in the art, and it is not required to be protected by the present document, and the specific implementation way thereof is also not used to limit the protection scope of the present document.

In step 101, a receiving end scans the received two-dimensional code information, and rectifies the received two-dimensional code information according to the locating information.

The receiving end collects the plane image from the sending end according to a preset frame rate synchronous with a transmitting frame rate of the LED array of the sending end, and performs lateral scanning and vertical scanning on the plane image.

In the image scanning process, firstly, a light brightness $E_i$ of each pixel point in the plane image is recorded, and the light brightness $E_i$ is compared with a preset light intensity value range $(E_{min}, E_{max})$ of the transmission data information after certain attenuation, when the light intensities exceeding or less than the range $(E_{min}, E_{max})$ are detected by the receiver, they are all regarded as the interference of the background light intensity, this part of light intensity values are removed, and only the detected light intensity values within the range $(E_{min}, E_{max})$ are retained, so as to remove the redundant light interference;

then, the image binaryzation processing is performed on the plane image from which the redundant light interference is removed, which includes:

respectively finding a maximum light brightness value $E_{max}$ and a minimum light brightness value $E_{min}$ in the plane image, and calculating an average value $E_{average}$ of the maximum light brightness value $E_{max}$ and the minimum light brightness value $E_{min}$; and according to the average value $E_{average}$, dividing brightness values in the image into two categories: light brightness values greater than the average value $E_{average}$ and light brightness values less than the average value $E_{average}$, and performing binaryzation processing on the two categories respectively. Wherein, the light brightness values greater than the average value $E_{average}$ are black images and represented as 1; and the light brightness values less than the average value $E_{average}$ are white images and represented as 0. The processed black-white image is the two-dimensional code graphic.

Figure 4:
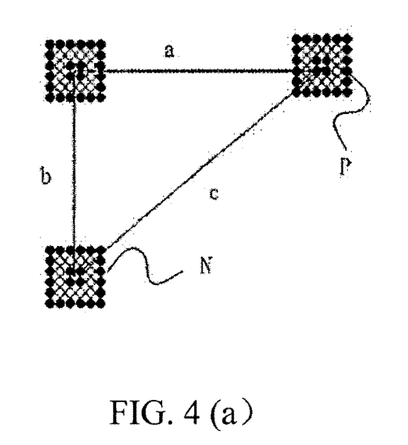
FIG. 4(a) is a schematic diagram of a triangle formed by connecting center points of three locating graphics in the sent plane image according to the present document.
FIG. 4(b) is a schematic diagram of a triangle formed by connecting center points of three locating graphics after the sent plane image is distorted according to the present document.

However, the geometric distortion may occur in the two-dimensional code graphic obtained through the image scanning of the receiver due to the jitter of the terminal, and at this point, it is required to further rectify the two-dimensional code graphic, to restore the received graphic with the geometric distortion, which specifically includes:

performing lateral scanning and axial scanning on the two-dimensional code graphic until the locating graphics in a standard scale namely a specific scale conforming to a scale invariance feature are found. As shown in the FIG. 3, even though the distortion occurs, the scale characteristic is also not changed. Four straight lines L1, L2, L3 and L4 in the standard scale firstly and ultimately scanned in the lateral direction and the axial direction are recorded, and after a quadrangle is made by the four straight lines, its diagonal lines are connected to obtain a center point of the locating graphic. The above process is repeated until the three center points of the three locating graphics in FIG. 4(a) are found, wherein, the method for determining the center points belongs to the technological means commonly used by the people skilled in the art, and it is a simple operation process, which will not be repeated here;

after the three center points are determined, the length of each side of a triangle constituted by the three center points is calculated, according to a short side a and a short side b of the triangle and an inclination angle α, a scanning area S' is calculated, and it is compared with an actual area S (i.e. an area without the distortion in the standard scale), and a slope Ratio of the scanned straight lines is obtained according to the formula (1) as follows:

$$\text{Ratio} = \frac{S'}{S} = \frac{\frac{1}{2} \times a \times b}{\frac{1}{2} \times (a + b \times \sin\alpha) \times b} \geq \frac{a}{a + a \times \sin\alpha} = \frac{1}{1 + \sin\alpha} \quad (1)$$

When the inclination angle α of the plane image changes between 0°~10°, the value of the slope Ratio changes between 0.85 to 1. The inclination angle α of the plane image can be obtained by the slope Ratio of the scanned straight lines, and then the inclination of the image is restored according to the α, and as shown in FIG. 4(b), the inclination is restored to a location of the imaginary line. A vertex (such as a fixed point M in the FIG. 4(b)) above the longest side c is taken as a top left corner of the plane image, and the image is rotated to be upright, as shown in the FIG. 4(a).

Figure 5:
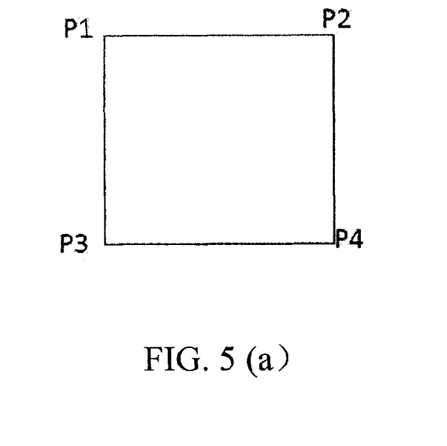
FIG. 5(a) is a schematic diagram of boundaries of a rectified plane image in the present document.
FIG. 5(b) is a schematic diagram of boundaries of an un-rectified plane image in the present document.

The image for which the rotation and inclination are restored is as shown in the FIG. 4(a), and then the boundary of the plane image is determined with the line approximation algorithm. It specifically includes: along the two sides, the short side a and short side b, of the triangle, respectively moving to scan in the direction far away from another vertex (such as a fixed point N and a fixed point P as shown in FIG. 4(a)), shifting one pixel outward each time, wherein an offset is δ (δ=±1), and acquiring the graphic obtained through scanning each straight line; repeating the scanning back and forth when reaching the boundary, and finely tuning the slope of the scanned straight line to obtain two optimal approximation lines; and then through the third point and along the straight lines respectively parallel to the above two optimal approximation lines, scanning in the direction far away from the above two optimal approximation lines, to obtain the rest two boundary straight lines. Eventually a contour of a closed quadrangle made by the four straight lines is obtained;

after the boundary contour of the plane image is determined, rectified coordinates are calculated according to the bilinear interpolation algorithm. P1, P2, P3 and P4 in FIG. 5(a) are 4 vertexes of the rectified plane image, and P1', P2', P3' and P4' are 4 vertexes of the un-rectified plane image. It is assumed that f(x,y) represents a pixel value of the rectified plane image, and f(x',y') represents a pixel value of the un-rectified plane image, thus a relation between the f(x,y) and the f(x',y') can be represented as the following formula (2):

$$f(x,y)=k_1x+k_2y+k_3xy+k_4$$

$$f(x',y')=k_5x+k_6y+k_7xy+k_8 \quad (2)$$

8 equation sets can be obtained by substituting the 8 vertexes P1, P2, P3, P4, P1', P2', P3' and P4' into 8 mapping coefficients in the formula (2), and the 8 mapping coefficients can be acquired through simultaneous equations of the 8 equation sets (the bilinear interpolation calculation is the calculation algorithm in the existing two-dimensional code decoding software, and the specific implementation is not used to limit the protections scope of the present document, and the specific implementation algorithm thereof also does not belong to the protection scope of the present document). Furthermore, since the rectified coordinates (x,y) may be floating point coordinates, the f(x,y) can be calculated according to coordinates of the 4 vertexes of the unit in which the un-rectified coordinates (x',y') are located by using the most adjacent points namely the interpolation algorithm: it is assumed that the coordinates of the 4 adjacent points of the coordinates (x',y') are respectively (x0',y0'), (x0',y1'), (x1',y0') and (x1',y1'), and the pixel values are f(0,0), f(0,1), f(1,0) and f(1,1), and according to the bilinear interpolation formula (3):

$$f(x,y)=[f(1,0)-f(0,0)]\times(x'-x'_0)+[f(0,1)-f(0,0)]\times(y'-y'_0)+[f(1,1)+f(0,0)-f(0,1)-f(1,0)]\times(x'-x'_0)\times(y'-y'_0)+f(0,0) \quad (3)$$

the pixel value f(x,y) of the coordinates (x,y) can be calculated. That is to say, by calculating the coordinates of each point, the plane coordinate transformation is performed, and the image is rotated to a horizontal level, to obtain the standard image whose pixel module is 1*1.

In the present document, the rectification on the image with the geometric distortion is implemented by using the two-dimensional code technology, and the rectification on the plane image sent by the LED array in the visible light communication MIMO system is implemented, which guarantees that the pixels of various points within one frame of image are simultaneously and correctly detected, and achieves the object of sending and receiving frames synchronously.

In step 102, the rectified two-dimensional code information is demodulated to obtain data.

The two-dimensional demodulation is performed on the plane image processed in the step 101 to obtain the original data.

Through the method of the present document, it is guaranteed that the pixels within one "frame" of plane can be simultaneously and correctly demodulated and be not affected by the jitter of the terminal and so on. In the visible light communication, the frame synchronization between the sending end and the receiving end is implemented. In addition, since the pixels within one "frame" of plane are accurately detected, the intersymbol interference is effectively restrained. The sending end of the visible light communication MIMO system of the present document sends the data in parallel with the multiplexing technology, which improves the sending gain, and also improves the illumination intensity in the meantime. Moreover, the two-dimensional array multipoint photoelectric detector array of the receiving end is in a two-dimensional multipoint structure and corresponds to the sending array, and the parallel data can be better mapped to the two-dimensional array multipoint photoelectric detector array via a spotlight convex lens, which improves the receiving efficiency.

Figure 6:
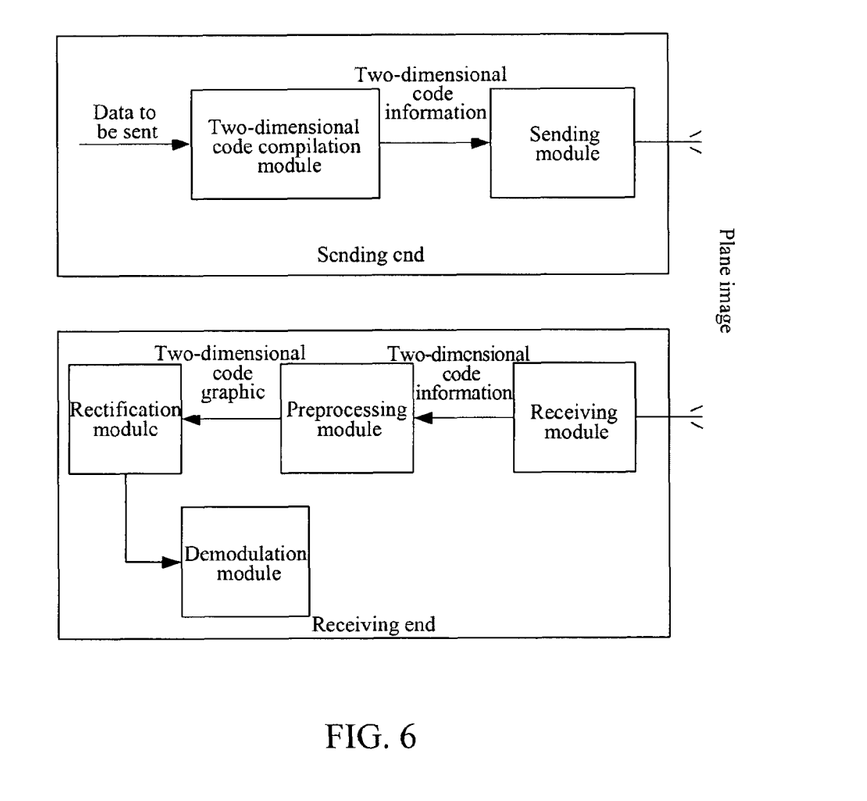
FIG. 6 is a schematic diagram of a composition structure of the visible light communication MIMO system according to the present document.

The present document also provides a visible light communication MIMO system, and as shown in FIG. 6, a sending end and a receiving end are included, wherein, the sending end is used to: convert data to be sent into two-dimensional code information containing locating information through light intensity modulation and compilation, and then send the two-dimensional code information containing locating information; and the receiving end is used to: scan the received two-dimensional code information, and rectify the received two-dimensional code information according to the locating information; and demodulate the rectified two-dimensional code information to obtain data.

As shown in FIG. 6, the sending end of the on present document at least includes a two-dimensional code compilation module and a sending module, wherein, the two-dimensional code compilation module is used to: compile the data to be sent into a two-dimensional code graphic; and the sending module is used to: through the light intensity modulation, modulate the compiled two-dimensional code graphic to a point light source and send the compiled two-dimensional code graphic in a form of a plane image. The sending module is an LED array, and a transmitting array can use the multiplexing technology.

The two-dimensional code graphic includes locating graphics; three locating graphics are included and respectively located at three vertex angles of the two-dimensional code graphic; and the locating graphics are constituted in a specific scale conforming to a scale invariance feature.

The receiving end of the present document at least includes a receiving module, a preprocessing module, a rectification module and a demodulation module, wherein, the receiving module is used to: receive the plane image containing the two-dimensional code information from the sending end. The receiving module can be a two-dimensional array multipoint photoelectric detector, and the receiving module collects the plane image from the sending end by using a preset frame rate synchronous with a transmitting frame rate of the LED array of the sending end. An imaging lens is further set above the two-dimensional array multipoint photoelectric detector and used for mirroring the plane image sent remotely to a receiver array.

The preprocessing module is used to: scan the received plane image containing the two-dimensional code information, remove redundant light interference and perform binaryzation processing, and output a processed two-dimensional code graphic to the rectification module.

The rectification module is used to: scan the two-dimensional code graphic from the preprocessing module, and acquire the locating graphics; and locate a boundary contour of the two-dimensional code graphic according to the locating graphics and rectify the two-dimensional code graphic to output to the demodulation module; and the demodulation module is used to: perform two-dimensional code demodulation on the processed two-dimensional code graphic from the rectification module, and obtain original data.

The above description is only the preferred embodiments of the present document, which is not used to limit the protection scope of the present document. All the modifications, equivalent substitutions, and improvements, etc. made within the spirit and principle of the present document shall fall into the protection scope of the present document.

INDUSTRIAL APPLICABILITY

In the embodiments of the present document, the rectification on the image with the geometric distortion is implemented by using the two-dimensional code technology, and the rectification on the plane image sent by the LED array in the visible light communication MIMO system is implemented, which guarantees that the pixels of various points within one frame of image are simultaneously and correctly detected, and achieves the object of sending and receiving frames synchronously, thereby improving the data transmission efficiency.

In the embodiments of the present document, the sending end of the visible light communication MIMO system sends the data in parallel with the multiplexing technology, which improves the sending gain, and also improves the illumination intensity in the meantime. Moreover, the two-dimensional array multipoint photoelectric detector array of the receiving end is in a two-dimensional multipoint structure and corresponds to the sending array, and the parallel data can be better mapped to the two-dimensional array multipoint photoelectric detector array via an imaging lens, which improves the receiving efficiency.

What is claimed is:

1. A method for realizing data transceiving in a visible light communication multiple input multiple output MIMO system, comprising: converting data of a sending end into two-dimensional code information containing locating information through light intensity modulation and compilation, and then sending the two-dimensional code information containing locating information;

a receiving end scanning received two-dimensional code information, and rectifying the received two-dimensional code information according to the locating information; and demodulating the rectified two-dimensional code information to obtain data;

wherein, the compilation is: compiling the data by using a two-dimensional code compiler, and converting the data into a two-dimensional code graphic;

wherein, said scanning received two-dimensional code information comprises: performing lateral scanning and vertical scanning on a plane image containing the two-dimensional code graphic;

removing redundant light interference in the plane image; and performing image binaryzation processing on the plane image from which the redundant light interference is removed;

wherein, said removing redundant light interference in the plane image comprises: recording a light brightness $E_i$ of each pixel point in the plane image, comparing the light brightness $E_i$ with a preset light intensity value range $(E_{min}, E_{max})$, and removing light intensity values exceeding or less than the range $(E_{min}, E_{max})$.

2. The method according to claim 1, wherein, the locating information is locating graphics constituted in a specific scale conforming to a scale invariance feature and located in the two-dimensional code graphic.

3. The method according to claim 2, wherein, there are three locating graphics.

4. The method according to claim 2, wherein, said rectifying the received two-dimensional code information according to the locating information comprises:

performing lateral scanning and vertical scanning on the two-dimensional code graphic until three locating graphics in the two-dimensional code graphic are acquired;

respectively determining a center point of each locating graphic, and calculating a length of each side of a triangle constituted by three center points;

calculating a scanning area S' according to lengths of two short sides of the triangle and an inclination angle α, and comparing the scanning area S' with an actual area S to obtain a slope;

rotating the two-dimensional code graphic according to the obtained slope, and restoring an inclined two-dimensional code graphic; and determining a boundary contour of the plane image, and calculating rectified coordinates according to a bilinear interpolation algorithm.

5. The method according to claim 4, wherein, the obtained slope is obtained according to the following formula:

$$\text{Ratio} = \frac{S'}{S} = \frac{\frac{1}{2} \times a \times b}{\frac{1}{2} \times (a + b \times \sin\alpha) \times b} \geq \frac{a}{a + a \times \sin\alpha} = \frac{1}{1 + \sin\alpha};$$

wherein,

S' is the scanning area, and S is the actual area;

a represents the length of a short side a in the sides of the triangle, and b represents the length of a short side b in the sides of the triangle; and α is the inclination angle.

6. The method according to claim 2, wherein, said rectifying the received two-dimensional code information according to the locating information comprises:

performing lateral scanning and vertical scanning on the two-dimensional code graphic until three locating graphics in the two-dimensional code graphic are acquired;

respectively determining a center point of each locating graphic, and calculating a length of each side of a triangle constituted by three center points;

calculating a scanning area S' according to lengths of two short sides of the triangle and an inclination angle α, and comparing the scanning area S' with an actual area S to obtain a slope;

rotating the two-dimensional code graphic according to the obtained slope, and restoring an inclined two-dimensional code graphic; and determining a boundary contour of the plane image, and calculating rectified coordinates according to a bilinear interpolation algorithm.

7. The method according to claim 1, wherein, said performing image binaryzation processing on the plane image from which the redundant light interference is removed comprises:

respectively finding a maximum light brightness value $E_{max}$ and a minimum light brightness value $E_{min}$ in the plane image, and calculating an average value $E_{average}$ of the maximum light brightness value $E_{max}$ and the minimum light brightness value $E_{min}$; and according to the average value $E_{average}$, dividing brightness values in the image into two categories: light brightness values greater than the average value $E_{average}$ and light brightness values less than the average value $E_{average}$, wherein, the light brightness values greater than the average value $E_{average}$ are black images and represented as 1; and the light brightness values less than the average value $E_{average}$ are white images and represented as 0.

8. A visible light communication MIMO system, comprising a sending end and a receiving end, wherein, the sending end is configured to: convert data to be sent into two-dimensional code information containing locating information through light intensity modulation and compilation, and then send the two-dimensional code information containing locating information; and the receiving end is configured to: scan received two-dimensional code information, and rectify the received two-dimensional code information according to the locating information; and demodulate the rectified two-dimensional code information to obtain data;

wherein, the receiving end at least comprises a receiving module, a preprocessing module, a rectification module and a demodulation module, wherein, the receiving module is configured to: receive the plane image containing the two-dimensional code information from the sending end;

the preprocessing module is configured to: scan the received plane image containing the two-dimensional code information, remove redundant light interference and perform binaryzation processing, and output a processed two-dimensional code graphic to the rectification module;

the rectification module is configured to: scan the two-dimensional code graphic from the preprocessing module, and acquire the locating graphics; and locate a boundary contour of the two-dimensional code graphic according to the locating graphics and rectify the two-dimensional code graphic to output to the demodulation module; and the demodulation module is configured to: perform two-dimensional code demodulation on the processed two-dimensional code graphic from the rectification module, and obtain original data;

wherein the preprocessing module is configured to: remove redundant light interference in the following way: recording a light brightness $E_i$ of each pixel point in the plane image, comparing the light brightness $E_i$ with a preset light intensity value range ($E_{min}$,$E_{max}$), and removing light intensity values exceeding or less than the range ($E_{min}$,$E_{max}$).

9. The visible light communication MIMO system according to claim 8, wherein, the sending end at least comprises a two-dimensional code compilation module and a sending module, wherein, the two-dimensional code compilation module is configured to: compile the data to be sent into a two-dimensional code graphic; and the sending module is configured to: through the light intensity modulation, modulate the compiled two-dimensional code graphic to a point light source and send the compiled two-dimensional code graphic in a form of a plane image.

10. The visible light communication MIMO system according to claim 9, wherein, the sending module is an LED array, and a transmitting array uses a multiplexing technology.

11. The visible light communication MIMO system according to claim 9, wherein, the two-dimensional code graphic comprises locating graphics; and the locating graphics are constituted in a specific scale conforming to a scale invariance feature.

12. The visible light communication MIMO system according to claim 11, wherein, there are three locating graphics which are respectively located at three vertex angles of the two-dimensional code graphic.

13. The visible light communication MIMO system according to claim 8, wherein, the receiving module is a two-dimensional array multipoint photoelectric detector.

14. The visible light communication MIMO system according to claim 13, wherein, an imaging lens is set above the two-dimensional array multipoint photoelectric detector and used for mirroring the plane image sent remotely to a receiver array.

15. The visible light communication MIMO system according to claim 14, wherein, the receiving module is configured to: collect the plane image from the sending end by using a preset frame rate synchronous with a transmitting frame rate of the LED array of the sending end.

\* \* \* \* \*